US007821978B2

(12) United States Patent
Staack

(10) Patent No.: US 7,821,978 B2
(45) Date of Patent: Oct. 26, 2010

(54) INITIATION OF PACKET-BASED SERVICES IN A PUBLIC MOBILE COMMUNICATION SYSTEM

(75) Inventor: Jens Staack, Ojakkula (FI)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 10/800,030

(22) Filed: Mar. 15, 2004

(65) Prior Publication Data

US 2005/0135348 A1 Jun. 23, 2005

(30) Foreign Application Priority Data

Dec. 22, 2003 (FI) .................................. 20031886

(51) Int. Cl.
*H04H 20/71* (2008.01)
(52) U.S. Cl. ....................... 370/312; 370/338; 370/353; 370/260; 455/90.2; 455/466
(58) Field of Classification Search ................. 370/338, 370/312, 260, 353; 455/41.2, 458, 90.2, 455/446
See application file for complete search history.

(56) References Cited

U.S. PATENT DOCUMENTS

| 6,477,150 | B1* | 11/2002 | Maggenti et al. ............. 370/312 |
| 7,020,098 | B2* | 3/2006 | Ehrsam et al. ................ 370/260 |
| 7,099,659 | B1* | 8/2006 | Schnake et al. ............... 455/419 |
| 7,146,163 | B2* | 12/2006 | Borsan ....................... 455/422.1 |
| 7,277,697 | B2* | 10/2007 | Desai et al. .................. 455/416 |
| 2002/0173326 | A1 | 11/2002 | Rosen et al. |
| 2004/0100987 | A1* | 5/2004 | Marque-Pucheau .......... 370/447 |
| 2004/0203770 | A1* | 10/2004 | Chen et al. ................. 455/435.1 |
| 2005/0136952 | A1* | 6/2005 | Zabawskyj et al. ........... 455/466 |
| 2005/0181726 | A1* | 8/2005 | Gottlieb et al. ............. 455/41.2 |
| 2005/0239485 | A1* | 10/2005 | Kundu et al. ................. 455/519 |
| 2006/0268750 | A1* | 11/2006 | Weiner ....................... 370/260 |

FOREIGN PATENT DOCUMENTS

| WO | WO 01/28168 A1 | 4/2001 |
| WO | WO 2003/041356 A1 | 5/2003 |

* cited by examiner

*Primary Examiner*—Nghi H Ly
*Assistant Examiner*—Amancio Gonzalez
(74) *Attorney, Agent, or Firm*—Alston & Bird LLP

(57) ABSTRACT

A mechanism and method for initiating a packet-based service session in a public mobile communication system, especially a service session for a group of users are disclosed. In order to accomplish a service initiation even if the terminals of the users are in a disconnected state with respect to the packet-switched domain of the mobile communication system, a triggering message is sent from one user terminal to the other terminals of the group. The triggering message includes information about a packet-based service session to be started, and it may be a message that can be sent via the mobile communication system to a mobile terminal that is in a disconnected state with respect to the packet-switched domain. In response to the reception of the triggering message, the other terminals are brought to a state allowing reception of packets belonging to the packet-based service session. When necessary, this feature involves establishing a connection from the other terminals to the packet-switched domain.

23 Claims, 3 Drawing Sheets

INITIATION OF PACKET-BASED SERVICES IN A PUBLIC MOBILE COMMUNICATION SYSTEM

FIELD OF THE INVENTION

The present invention relates generally to initiation of a packet-based service in a public mobile communication system, especially a service that is commonly called the Push-to-talk-over-Cellular (PoC) service. The name of the said service derives from a basic feature of the service; it allows calls to be started in a cellular network with just a push of a button.

BACKGROUND OF THE INVENTION

Push-to-talk communication, in which an individual pushes a button to talk to other individuals belonging to the same talk group, has been used and has been popular in Land Mobile Radio (LMR) and Professional Mobile Radio (PMR) networks. However, the provision of a similar service in public cellular networks has been unprofitable in the past, since the implementation of the service in circuit-switched cellular networks would have wasted radio and network resources excessively.

The above drawback can now be eliminated with the help of the GPRS (General Packet Radio Service) technology introduced into cellular networks. This technology, which enables IP (Internet Protocol) packet technology to be introduced into cellular networks, will make efficient implementation of the push-to-talk service possible, thereby making the service available in cellular networks. By means of the GPRS/IP technology, the efficiency of network resource usage can be dramatically improved in situations where a group of people needs to communicate with each other repeatedly, but occasionally. Namely, this technology allows the radio and network resources to be reserved only for the duration of the talk spurts.

The implementation of the new push-to-talk cellular services is based on the IP Multimedia Subsystem (IMS), as specified by the 3rd Generation Partnership Project (3GPP). The IMS integrates mobile voice communications with Internet technologies, allowing IP-based multimedia services to be utilized in mobile networks. The push-to-talk service is implemented using PoC application servers in the IP Multimedia CN (Core Network) subsystem. These servers handle call set-up signaling for the push-to-talk calls, reservation of speaking turns for one user at a time, and routing of the packets to the recipients, for example.

Currently, PoC users must be connected to the GPRS network before a PoC session can be established. In other words, the mobile terminals must move from a detached state (IDLE) to the attached state (READY) in order to be ready for a possible PoC session. However, many users wish to stay in the detached state, i.e. in the mode in which the mobile terminal is not connected to the GPRS network. This is because they fear that if the mobile terminal is constantly connected to the GPRS network, they may receive unwanted GPRS data, which may, in turn, cause unwanted costs or involve security risks. This makes the practical initiation of a PoC session complicated. If the terminals use dynamic IP addresses, as is the case in IPv4 networks, the GPRS network has no technical means for forcing these terminals to the connected mode. Therefore, the person who wants to start a PoC session within a PoC group has to ensure, for example by making phone calls, that the terminals of the users of the group are connected to the GPRS network.

The present invention seeks to eliminate the above-described drawback related to the initiation of push-to-talk services or similar packet-based services in a public mobile communication system.

SUMMARY OF THE INVENTION

The present invention seeks to bring about a novel mechanism for initiating a packet-based service session in a public mobile communication system including a packet-switched domain (such as a GPRS network). The present invention also seeks to bring about a mechanism that allows the service session to be started smoothly and easily, even if the terminals of the users of the service are detached from the packet-switched domain of the mobile communication system prior to the start of the service session.

In the present invention, a separate triggering message is utilized to move a terminal to a state in which it is ready for a packet-based service session. In response to the triggering message, a terminal disconnected from the packet-switched domain moves to a connected state in order to be ready for the packet-based service session to be started. The triggering message is typically a Short Message Service (SMS) message, a Multimedia Message Service (MMS) message, a Multimedia Broadcast/Multicast Service (MBMS) broadcast message, or an MBMS multicast message. However, it may also be any other message that can be sent via a mobile communication system to a mobile terminal that is in a disconnected state with respect to the packet-switched domain, i.e. a message that can be sent without the use of the packet-switched domain or that can be sent to a mobile terminal which is otherwise not ready to participate in an upcoming packet-based service session.

Thus one embodiment of the invention is the provision of a method for initiating a packet-based service session in a mobile communication system. The method includes the steps of sending a triggering message to at least one first mobile terminal of the mobile communication system, the triggering message including information about a packet-based service session to be started, and receiving the triggering message in the at least one first mobile terminal. The method also includes bringing, in response to the receiving step, at least one of the at least one first mobile terminal to a state allowing reception of packets belonging to the packet-based service session from a packet data network belonging to the mobile communication system.

In another embodiment, the invention provides a system for initiating a packet-based service session in a mobile communication system. The system includes first means for sending a triggering message to at least one mobile terminal of the mobile communication system, the triggering message including information about a packet-based service session to be started, and second means for receiving the triggering message in the at least one mobile terminal. The system further includes third means, responsive to the second means, for bringing the at least one mobile terminal to a state allowing reception of packets belonging to the packet-based service session from a packet data network belonging to the mobile communication system.

In a further embodiment, the invention provides a mobile terminal for a mobile communication system. The mobile terminal includes first interface means for receiving a triggering message, the triggering message including information about a packet-based service session to be started, and state transition means, operatively connected to the first interface means, for bringing, in response to the triggering message, the mobile terminal to a state allowing reception of packets belonging to the packet-based service session from a packet data network belonging to the mobile communication system.

In response to the triggering message, a terminal is thus controlled to a state in which it is ready to start the packet-based service session. If the terminal is in a disconnected state with respect to the packet data network, this control involves establishing a connection to the said network.

By means of the solution of the invention the user of a packet-based service can start a service session without having to check whether the other members of the group are connected to the packet-switched domain, and the other members may join the session even if their terminals are not connected to the packet-switched domain when the session is about to begin. The method of the invention is particularly suitable for starting a session of more than two participants, since all the participants can be invited by sending one group message.

A further advantage of the invention is that it makes timed initiation of one or more service sessions uncomplicated. In other words, an individual may easily invite the other members of the group to one or more sessions that will be held at given times in the future, such as during the next week.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 5 in the appended drawings, wherein.

DETAILED DESCRIPTION OF THE INVENTION

Figure 1:
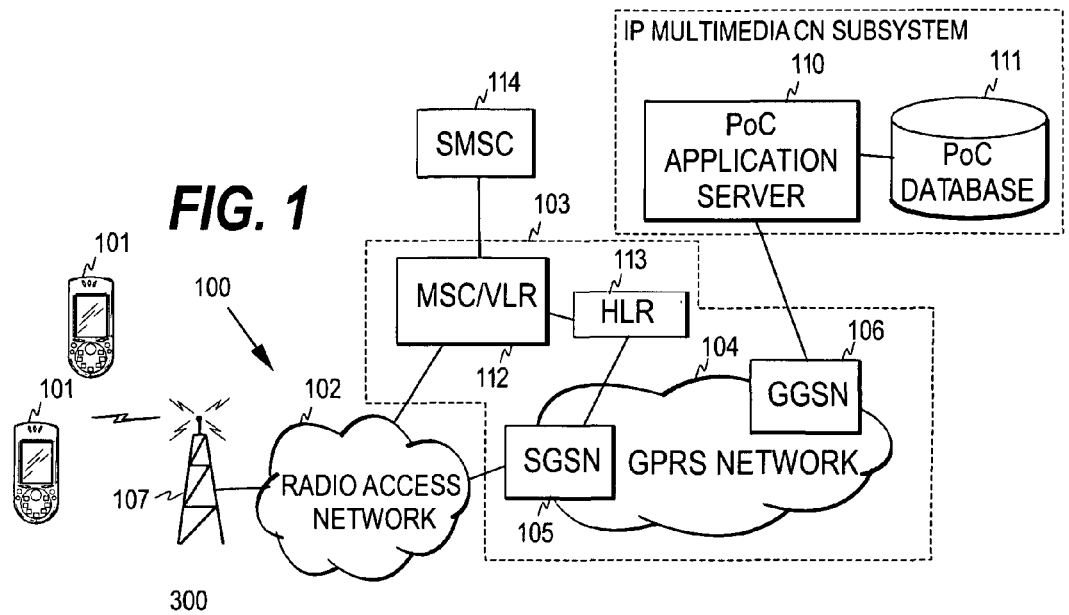
FIG. 1 illustrates an example of a communication environment in which the principles of the present invention may be beneficially implemented.

FIG. 1 shows an example of a typical communication environment in which the present invention can be applied. As is commonly known, a cellular system 100 consists of three interacting domains: user equipment 101, a Radio Access Network (RAN) 102, and a Core Network (CN) 103. The Core Network is divided into circuit-switched and packet-switched domains, the former being responsible for the traditional circuit-switched services and the latter for packet-switched services. The circuit-switched domain is connected via a Mobile services Switching Centre (MSC) 112 and the packet-switched domain, which is formed by a General Packet Radio Service (GPRS) network 104, via a Serving GPRS Support Node (SGSN) 105 to the Radio Access Network. The MSC comprises a Visitor Location Register (VLR), which is a database holding a copy of a visiting user's service profile and information on the location of the mobile terminal. The MSC/VLR is further connected to external circuit-switched networks, such as Public Switched Telephone Networks (PSTNs). Some network elements of the Core Network, such as the Home Location Register (HLR) 113, are shared by the packet-switched domain and the circuit-switched domain. The Radio Access Network comprises a plurality of base stations 107 with which mobile terminals 101 communicate through a radio interface. The user of a mobile terminal is thus a subscriber in a cellular communication system, such as the GSM or UMTS system.

The push-to-talk service is implemented using PoC application servers 110 within an IP Multimedia CN (Core Network) subsystem (only one server is shown in the figure). As mentioned above, these servers handle, for example, call set-up signaling for the push-to-talk calls, reservation of speaking turns for one user at a time, and routing of the packets to the recipients. The PoC application servers also provide interfaces to the operator's provisioning and management systems and create charging data records (CDRs), which can be used as a basis for billing. The PoC servers are provided with PoC databases 111 which contain, for example, the rights and profiles related to the subscribers and talk groups. Each PoC application server is connected to the GPRS network 104, particularly to a Gateway GPRS Support Node (GGSN) 106 that connects the GPRS network to external (from the point of view of the cellular system) packet-switched networks.

For initiating a PoC session, the present invention utilizes a triggering message, which is an SMS message in the embodiment of FIG. 1. Therefore, a further network element relevant to the invention is a Short Message Service Center (SMSC) 114, which is the network element that stores and forwards the short messages sent in the cellular system. The SMSC is connected to the MSC through a signaling network, such as the SS7 network.

Figure 2:
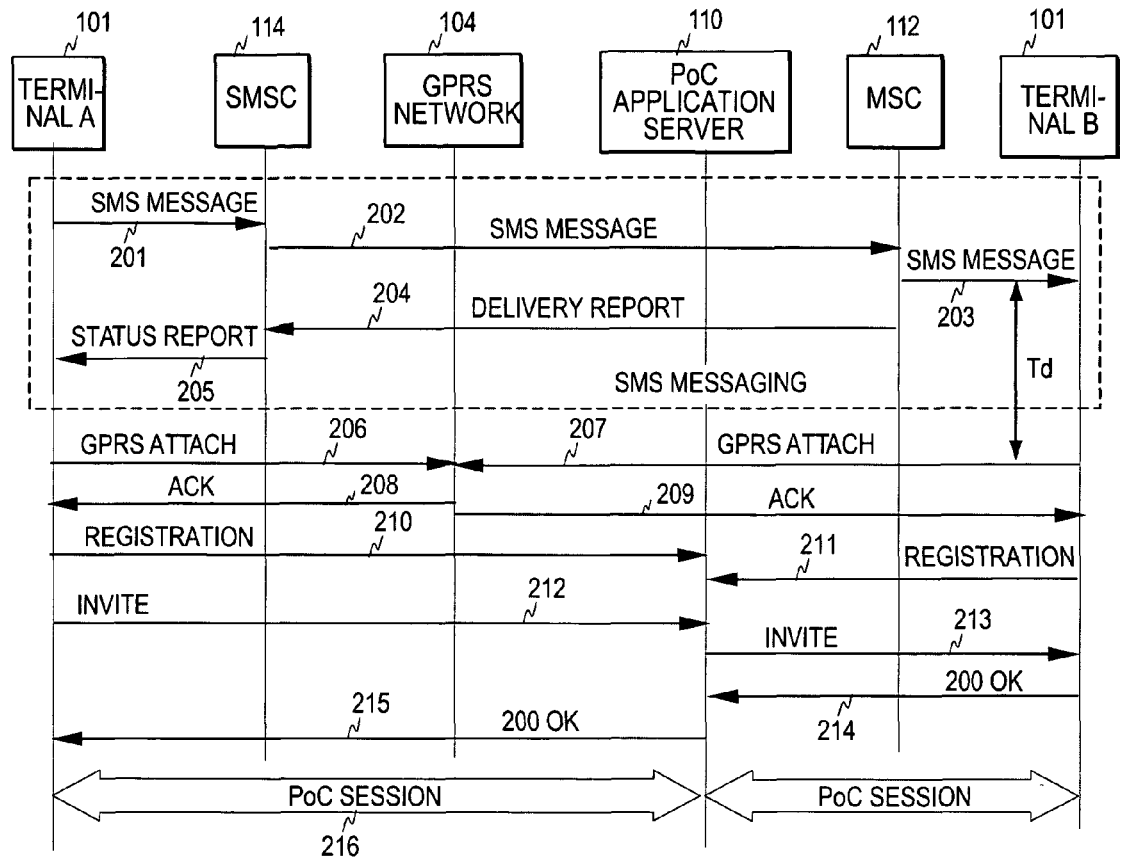
FIG. 2 illustrates one embodiment of the invention by showing the message exchange between different entities shown in FIG. 1.

FIG. 2 illustrates an example of the message exchange between the above network entities when a PoC session is initiated. It is assumed in the example, that the user of terminal A invites the user of terminal B to join a PoC session. It is further to be noted that the figure illustrates the general outline of one embodiment of the method of the invention. The practical implementation may therefore vary and include more details.

When the user of terminal A wants to set-up a PoC session within a certain talk group, he or she supplies the necessary information at his/her terminal. Based on the information, an SMS message is composed and sent to terminal B. The SMS message contains an identifier that indicates the type of the SMS message, i.e. that the message is a triggering message for initiating a PoC session. The SMS message is sent in a known manner via the SMSC and the home or visited MSC 112 to terminal B (steps 201 to 203). Furthermore, a report confirming the delivery or informing of a failure may be returned to the mobile terminal (steps 204 and 205), as is common in the SMS systems.

In response to the SMS message, terminal B connects to the packet-switched domain, which is a GPRS network in this example, by performing the GPRS attach procedure (step 207). In one embodiment of the invention, the SMS message contains information indicating the starting time of the PoC session. If this information is used in the SMS message, the terminal receiving the message performs the GPRS attach procedure substantially at the time indicated in the message. For example, the user of terminal A may send an SMS message in the morning, inviting the user of terminal B to participate in a PoC session scheduled to start at 20:00 hours in the evening. As discussed below, the user may also be prompted for a decision, whether the invitation is accepted, i.e. whether to perform the GPRS attach procedure or not.

If the SMS message does not contain the starting time of the PoC session, the GPRS attach procedure is performed immediately in response to the reception of the triggering SMS message. Therefore, the time Td from the reception of the SMS message to the setting-up of a connection to the GPRS network may vary from zero to an arbitrary value depending on the starting time indicated in the SMS message. Thus, terminal B attaches to the GPRS network immediately having received the triggering SMS message or at the time indicated in the said message. A successful attach procedure is acknowledged by the GPRS network (step 209).

It is assumed in the example of FIG. 2 that terminal A also performs the GPRS attach procedure at the time indicated in the triggering SMS message (steps 206 and 208). The terminal from which the triggering SMS message is transmitted may also perform the GPRS attach procedure slightly before the time indicated in the message. If there is no starting time in the message, this terminal may connect to the GPRS network after having received the status report. It may also connect to the GPRS network immediately after having sent the SMS message or just before the message is sent, especially if no delivery report is returned to the terminal.

When the terminals have performed the GPRS attach procedure successfully, each terminal registers with the PoC application server by sending (steps 210 and 211) the server the Session Initiation Protocol (SIP) REGISTER request. The server acknowledges the request by sending a SIP response with the relevant status code (i.e. 200/OK). After the registration, terminal A may start the session by sending an INVITE request according to the SIP to the PoC application server (step 212). The INVITE request invites the other terminals to participate in the session, and it includes a description of the session, for example. The PoC server forwards the invitation to each terminal (step 213). Each terminal acknowledges the invitation by sending a SIP response with the relevant status code (i.e. 200/OK). Having received the acknowledgments from the invited terminals (step 214), the PoC application server sends an acknowledgment to terminal A (step 215), and the PoC session (step 216) may start. One or more parties may be invited to the session in the same manner, since the triggering message may be delivered to several terminals.

Figure 3:
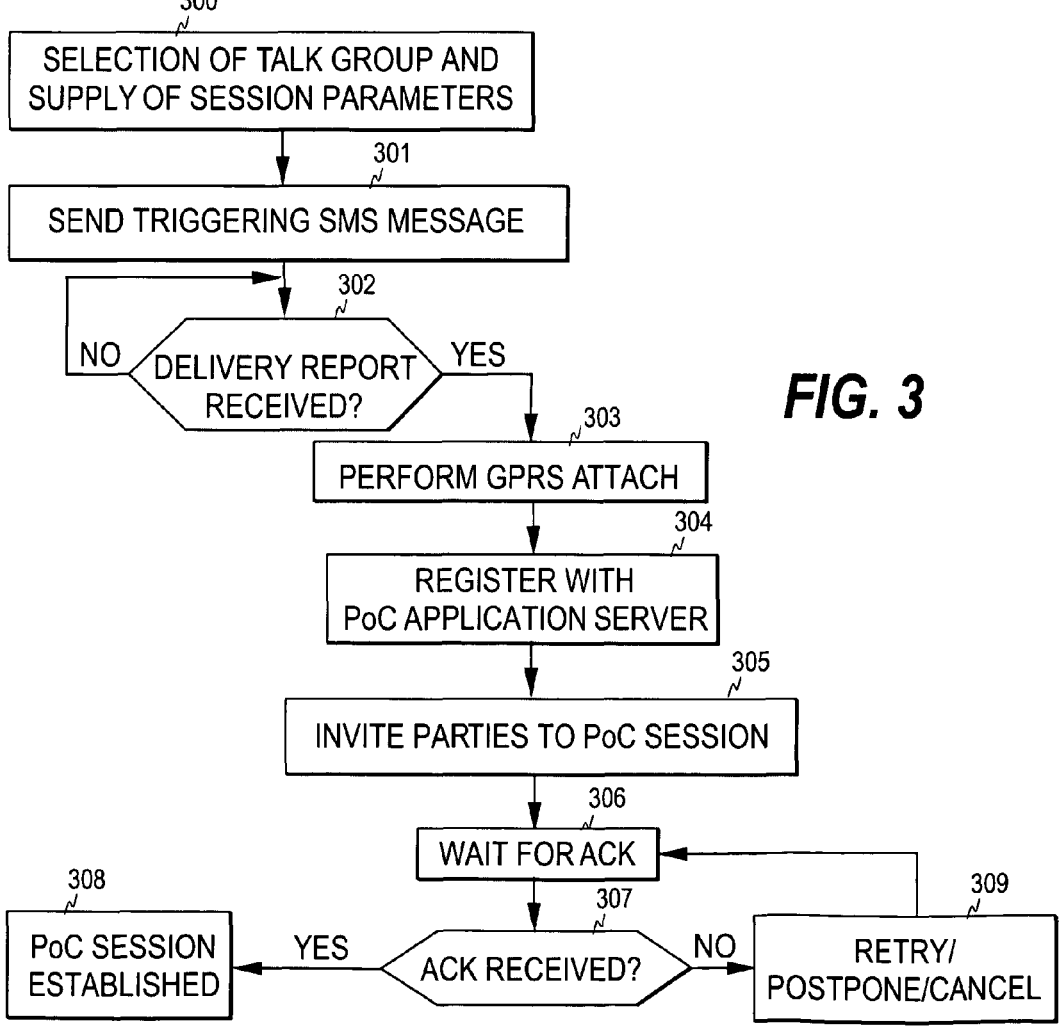
FIG. 3 is a flow chart illustrating one embodiment of the operation of a mobile terminal acting as a session initiator.

FIG. 3 is a flow chart illustrating one embodiment of the sending of a triggering SMS message. The PoC client software residing in the terminal allows the user to view and modify the talk groups, for example. In addition to the selection of the talk group, the user may supply user-selectable parameters, such as the starting time of the PoC session (step 300). Based on the information given by the user, the terminal composes a triggering SMS message that contains the information necessary for starting a PoC session, such as the address of the PoC server, the identifier of the talk group, and the initiator of the PoC session. The terminal then sends (step 301) the triggering SMS message to each member of the talk group (except to itself). Since the SMS message is not used for any other purpose, the session-specific information carried by it may be inserted into the message body, for example. However, the type of the message, which indicates that the message is an SMS message carrying information about a PoC session to be initiated, may be carried in the header of the message.

When the triggering SMS message has been sent, the operation depends on whether the message included the starting time of the PoC session. If there was no starting time in the message, i.e. if the session is intended to be started directly, the terminal may wait for the delivery report (step 301) and perform the GPRS attach procedure (step 303) after the report is received. The terminal may also perform the GPRS attach procedure immediately after having sent the triggering SMS message. However, if the message included the starting time, the GPRS attach procedure is performed substantially at that particular time.

As discussed above, when the connection to the GPRS network has been established, the terminal registers with the PoC application server (step 304) and invites the other members of the talk group to participate in the session (step 305). The terminal then waits for an acknowledgment from the PoC server (step 306). When this has been received, the user may start to speak to the other members of the group (step 308). If the acknowledgment is not received within a predetermined waiting time, the operation may continue in various ways (step 309). For example, the terminal may repeat the invitation (steps 305 and 306) several times and cancel the session if no acknowledgment is received from the server after a predetermined number of retries.

Figure 4:
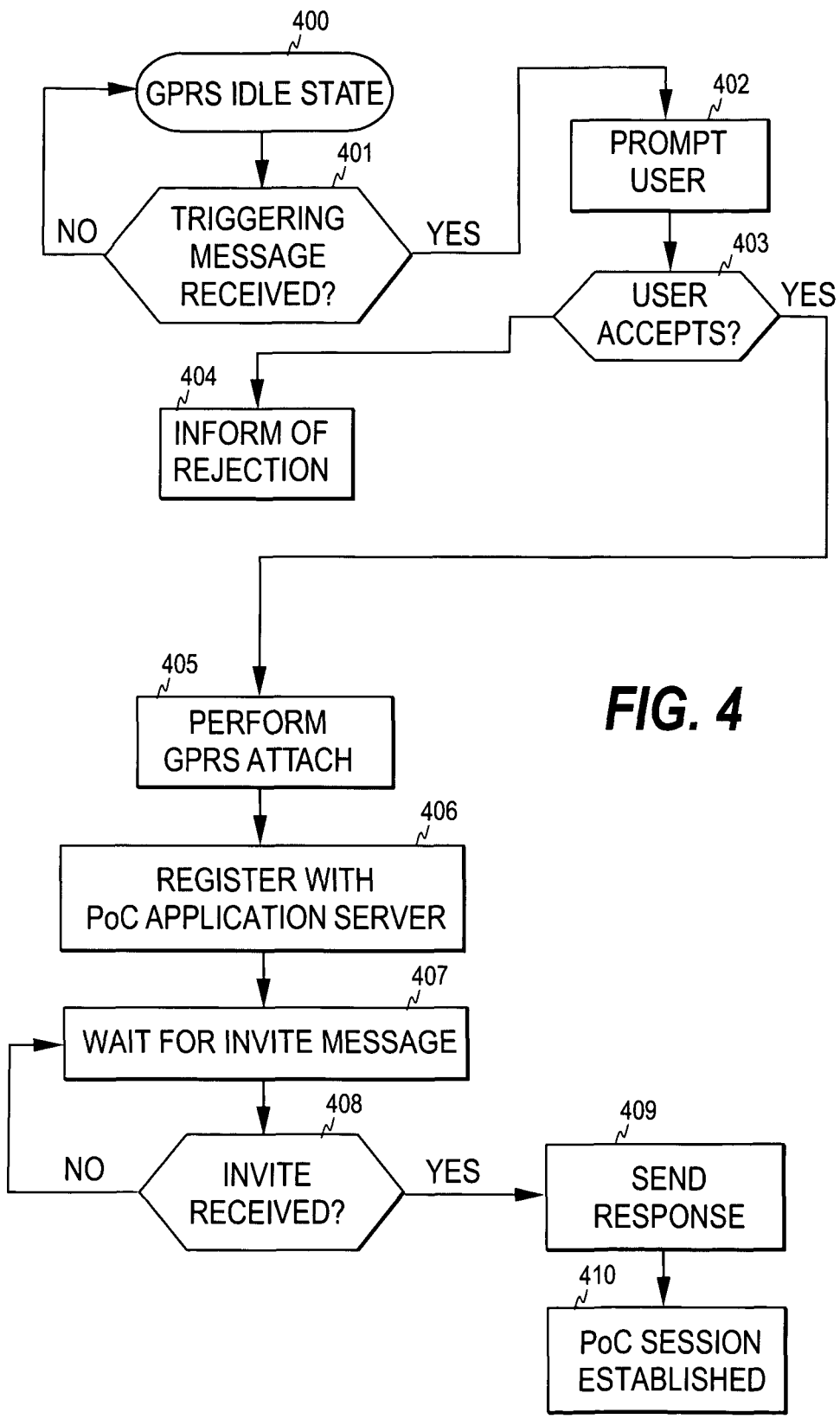
FIG. 4 a flow chart illustrating one embodiment of the operation of a mobile terminal being invited to a service session.

FIG. 4 illustrates one embodiment of the operation of a mobile terminal receiving an invitation to a PoC session. As discussed above, the terminal may wait for a triggering SMS message in a GPRS idle state (step 400). When this message is received, the terminal typically prompts the user for a decision through the user interface of the terminal (step 402). A message containing information about the service session may be shown in the display of the mobile node. The text displayed might be, for example, as follows: "You are invited to a PoC service session within talk group "football" at 20:00 hours. Do you want to participate?" If the user declines the invitation, the inviting terminal may be informed of the user's decision (step 404). This may be accomplished, for example, by sending a response SMS message to the inviting terminal.

However, if the user accepts the invitation, the GPRS attach procedure is performed immediately or as a timed operation scheduled according to the starting time information received in the SMS message (step 405). The terminal then registers itself with the PoC application server (step 406) and waits for an invite message (step 407) from the server. When the invite message arrives, it is acknowledged by sending a SIP response with the relevant status code (step 409). The session is then established. The actual service session may then be implemented in various ways.

Instead of prompting the user for the acceptance of the invitation at the time of the arrival of the SMS message, the user may also be prompted when the service session is due to start.

In the above examples, it was assumed that the terminal was initially in the disconnected state with respect to the GPRS network. Should the terminal be in the connected state when the SMS message is sent/received, the attach procedure may be skipped. It is thus possible that the user is not registered with the PoC server, even though his or her terminal is attached to the GPRS network and to the IP Multimedia CN subsystem. In these cases the separate triggering message is utilized to cause the terminal to register with the PoC server. If it is known that the terminal is attached to the GPRS network, the triggering message may utilize the GPRS network. The triggering message may then initiate the registration process, either immediately or substantially at the time given in the message. In these cases the triggering message may also be an Instant Message (IM), for example, and any presence service providing the necessary status information may be utilized to indicate that a terminal is on-line and available to receive the triggering message.

Furthermore, in the above examples the invitation was either automatically accepted or the user was requested to accept or reject the invitation. These two embodiments may also be combined so that some of the invitations are accepted automatically, while the user is asked to accept or reject the other invitations. The user may, for example, define which talk groups are such that the respective invitations can be accepted automatically.

Figure 5:
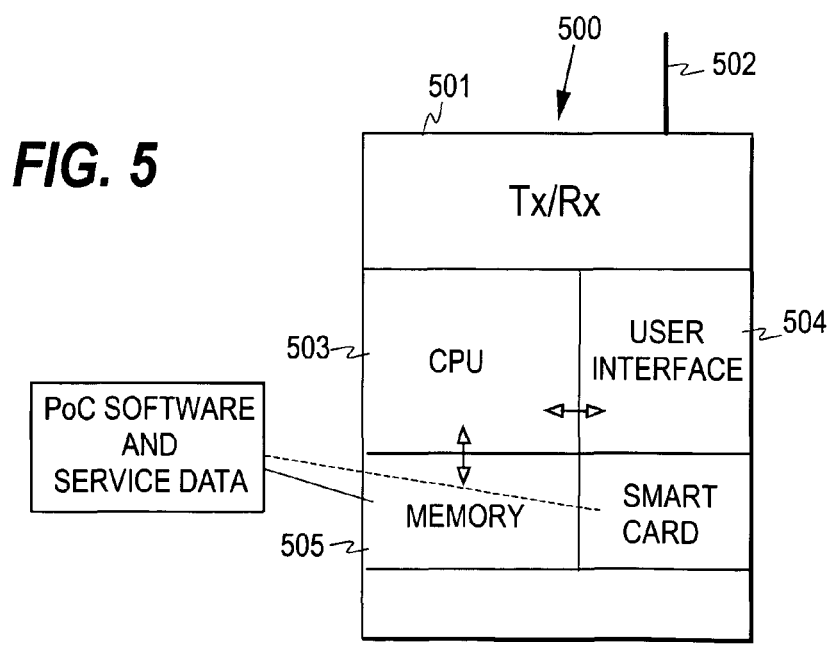
FIG. 5 is a block diagram illustrating the basic elements of the terminal according to one embodiment of the invention.

FIG. 5 illustrates the basic elements of the terminal according to one embodiment of the invention. The mobile terminal 500 comprises a transceiver 501 provided with at least one antenna 502, a control unit 503, user interface means 504 for creating a user interface through which the user can operate the terminal, and memory means 505, which may include one or more smart cards 506, such as a Subscriber Identity Module (SIM) card or a Universal SIM (USIM) card. The memory means include the PoC application (client software) and the related PoC service data, such as the talk groups and their parameters. It is also possible that the PoC application (client software) resides in the SIM/USIM card, or generally in a Universal IC Card (UICC). The control unit handles, under the control of the PoC client software, the sending and receiving of the triggering messages, as well as the changing of the states of the terminal. The control unit further controls the user interface for obtaining the service parameters from the user, for informing the user of an invitation received, and for obtaining the user's decision on the invitation.

Although the invention was described above with reference to the examples shown in the appended drawings, it is obvious that the invention is not limited to these, but may be modified by those skilled in the art without departing from the scope and spirit of the invention. For example, the communication environment in which the method is applied may vary and evolve according to future development. Therefore, different terms may be used of various items related to the invention. For example, different terms may be used for the packet-switched domain and the states of the terminal with respect to that domain. In the appended claims the packet-switched domain is termed the packet data network. Furthermore, the service does not have to be a PoC service, but may be another packet-based service for two or more participants. The service may also be based on other protocols than the SIP. It is also possible that the triggering message is sent from a fixed terminal. For example, a person scheduling forthcoming service sessions may send triggering messages from a desktop computer to all the mobile terminals within each service group, including his or her own terminal.

The invention claimed is:

1. A method, comprising:
receiving, in a mobile terminal belonging to a communication group in a mobile communication system, a triggering message indicating the communication group and informing the mobile terminal of a packet-based service session of the communication group to be initiated; and in response to the receiving, bringing the mobile terminal to a state allowing reception of packets from a packet data network belonging to the mobile communication system, to enable participation in the packet-based service session of the communication group, wherein the receiving comprises receiving the triggering message so that the triggering message is receivable from the mobile communication system when the mobile terminal is in an idle state and regardless of whether the mobile terminal is ready to participate in the packet-based service session, and the triggering message indicates a starting time for the packet-based service session and the mobile terminal is brought to said state substantially at said starting time.

2. A method according to claim 1, wherein the bringing includes causing establishment of a connection to the packet data network.

3. A method according to claim 1, wherein the bringing includes causing a user of the mobile terminal to be registered with a server offering the packet-based service session.

4. A method according to claim 2, wherein the bringing further includes causing a user of the mobile terminal to be registered with a server offering the packet-based service session.

5. A method according to claim 3, wherein the server comprises a push-to-talk-over-cellular server.

6. A method according to claim 4, wherein the server comprises a push-to-talk-over-cellular server.

7. An apparatus comprising at least one processor and at least one memory including computer program code, the at least one memory and the computer program code configured to, with the at least one processor, direct the apparatus at least to:

receive a triggering message, wherein the triggering message indicates a communication group to which the apparatus belongs and informs the apparatus of a packet-based service session of the communication group to be initiated, and bring, in response to the triggering message, the apparatus to a state allowing reception of packets from a packet data network, that is included in a mobile communication system, to enable participation in the packet-based service session of the communication group, wherein the apparatus is directed to receive the triggering message so that the triggering message is receivable from the mobile communication system when the apparatus is in an idle state and regardless of whether the apparatus is ready to participate in the packet-based service session, and the triggering message indicates a starting time for the packet-based service session and the processor is further configured to bring the apparatus to said state substantially at said starting time.

8. An apparatus according to claim 7, wherein the apparatus is further directed to cause establishment of a connection to the packet data network when the apparatus comprises a disconnected state with respect to the packet data network when the apparatus is to be brought to said state.

9. An apparatus according to claim 7, wherein the apparatus is further directed to cause a user of the apparatus to be registered with a server offering the packet-based service session.

10. An apparatus according to claim 8, wherein the apparatus is further caused to register a user of the apparatus with a server offering the packet-based service session.

11. An apparatus according to claim 9, wherein the server comprises a push-to-talk-over-cellular server.

12. An apparatus according to claim 10, wherein the server comprises a push-to-talk-over-cellular server.

13. An apparatus according to claim 7, wherein the apparatus is further caused to bring the apparatus to said state substantially without delay in response to the triggering message.

14. An apparatus comprising at least one processor and at least one memory including computer program code, the at least one memory and the computer program code configured to, with the at least one processor, direct the apparatus at least to:

compose a triggering message indicating a communication group comprising, in addition to the apparatus, at least one first terminal, wherein the terminals of the communication group have unknown attachment statuses relative to a packet data network that is included in a mobile communication system; and initiate sending of the triggering message from the apparatus to the at least one first terminal, so as to inform the at least one first terminal of a packet-based service session of the communication group to be initiated, wherein the apparatus is directed to initiate the sending of the triggering message so that the triggering message is receivable by a second terminal that is in an idle state and regardless of whether the second terminal is ready to participate in the packet-based service session, wherein the second terminal is any of the at least one first terminal, and the triggering message indicates a starting time for the packet-based service session and the apparatus is further caused to bring the apparatus to said state substantially at said starting time.

15. A method according to claim 1, further comprising:
causing a user of the mobile terminal to be prompted to accept the packet-based service session.

16. An apparatus according to claim 7, wherein the apparatus is further directed to cause a user of the apparatus to be prompted to accept the packet-based service session.

17. An apparatus according to claim 14, wherein the apparatus comprises a mobile terminal and the second mobile terminal is any of the at least one first mobile terminal.

18. An apparatus, comprising:
message composing means for composing a triggering message indicating a communication group comprising, in addition to the apparatus, at least one first terminal, wherein the terminals of the communication group have unknown attachment statuses relative to a packet data network that is included in a mobile communication system; and first interface means for causing sending of the triggering message from the apparatus to the at least one first terminal, so as to inform the at least one first apparatus of a packet-based service session of the communication group to be initiated, wherein the first interface means is configured to cause sending of the triggering message so that the triggering message is receivable by a second terminal that is in an idle state and regardless of whether the second terminal is ready to participate in the packet-based service session, wherein the second apparatus is any of the at least one first terminal, wherein the triggering message indicates a starting time for the packet-based service session and the at least one first terminal is brought to said state substantially at said starting time.

19. The apparatus of claim 14, wherein the triggering message comprises a multimedia message service message.

20. A method, comprising:
composing, in an originating mobile terminal, a triggering message indicating a communication group comprising, in addition to the originating terminal, at least one first terminal, wherein the terminals of the communication group have unknown attachment statuses relative to a packet data network that is included in a mobile communication system; and causing sending of the triggering message from the originating terminal to the at least one first terminal, so as to inform the at least one first terminal of a packet-based service session of the communication group to be initiated, wherein the triggering message is sent so that the triggering message is receivable by a second terminal that is in an idle state and regardless of whether the second terminal is ready to participate in the packet-based service session, wherein the second terminal is any of the at least one first terminal, wherein the triggering message indicates a starting time for the packet-based service session and the at least one first terminal is brought to said state substantially at said starting time.

21. The method of claim 20, wherein the triggering message comprises a multimedia message service message.

22. A memory having software stored thereon, the software configured to control a processor to perform a process, the process comprising:
receiving, in a mobile terminal belonging to a communication group in a mobile communication system, a triggering message indicating the communication group and informing the mobile terminal of a packet-based service session of the communication group to be initiated; and in response to the receiving, bringing the mobile terminal to a state allowing reception of packets from a packet data network belonging to the mobile communication system, to enable participation in the packet-based service session of the communication group, wherein the receiving comprises receiving the triggering message so that the triggering message is receivable from the mobile communication system when the mobile terminal is in an idle state and regardless of whether the mobile terminal is ready to participate in the packet-based service session, and the triggering message indicates a starting time for the packet-based service session and the mobile terminal is brought to said state substantially at said starting time.

23. A memory having software stored thereon, the software configured to control a processor to perform a process, the process comprising:
composing, in an originating mobile terminal, a triggering message indicating a communication group comprising, in addition to the originating terminal, at least one first terminal, wherein the terminals of the communication group have unknown attachment statuses relative to a packet data network that is included in a mobile communication system; and causing sending of the triggering message from the originating terminal to the at least one first terminal, so as to inform the at least one first terminal of a packet-based service session of the communication group to be initiated, wherein the triggering message is sent so that the triggering message is receivable by a second terminal that is in an idle state and regardless of whether the second terminal is ready to participate in the packet-based service session, wherein the second terminal is any of the at least one first terminal, wherein the triggering message indicates a starting time for the packet-based service session and the at least one first terminal is brought to said state substantially at said starting time.

* * * * *